US005372743A

United States Patent [19]

Miyamoto et al.

[11] Patent Number: 5,372,743

[45] Date of Patent: Dec. 13, 1994

[54] SURFACTANT COMPOSITION, DEGREASING COMPOSITION AND DEGREASING BATH

[75] Inventors: Satoshi Miyamoto, Toyonaka; Isao Kawasaki, Kawasaki; Kaoru Komiya, Ebina, all of Japan

[73] Assignees: Nippon Paint Co., Ltd., Osaka; Asahi Denka Kogyo K.K., Tokyo, Japan

[21] Appl. No.: 103,322

[22] Filed: Aug. 9, 1993

Related U.S. Application Data

[63] Continuation of Ser. No. 739,969, Aug. 5, 1991, abandoned, which is a continuation-in-part of Ser. No. 507,436, Apr. 11, 1990, abandoned.

[30] Foreign Application Priority Data

Apr. 11, 1989 [JP] Japan .................................... 1-91504

[51] Int. Cl.[5] .......................... C11D 3/36; C07F 9/09

[52] U.S. Cl. ............................... 252/174.16; 252/135; 558/186

[58] Field of Search .......................... 252/174.16, 135; 558/186

[56] References Cited

FOREIGN PATENT DOCUMENTS 541307 1/1979 Japan ............................ 252/174.16

5672093 6/1981 Japan ............................ 252/174.16

*Primary Examiner*—Asok Pal

*Assistant Examiner*—P. Achutamurthy

*Attorney, Agent, or Firm*—Sughrue, Mion, Zinn, Macpeak & Seas

[57] ABSTRACT

The degreasing composition comprises a surfactant composition comprising a compound (a) represented by the general formula (1):

$$R^1O(AO)_nH \quad (1)$$

wherein $R^1$ is a substituted or unsubstituted hydrocarbon group having 6 or more carbon atoms; A is at least one group selected from the group consisting of an ethylene group, a propylene group, a butylene group and a styrene group, provided that an ethylene group in A is 5 mol or more per 1 mol of $R^1$, and that the ethylene group is 50 mol % or more per 100 mol % of said A; and n is an integer of 5–50;

a compound (b1) represented by the general formula (2):

$$R^2O-\overset{\overset{O}{\|}}{P}(O(EO)_nH)_2 \quad (2)$$

wherein $R^2$is a substituted or unsubstituted hydrocarbon group having 6 or more carbon atoms, E is an ethylene group, and n is an integer of 1–20; and a compound (b2) represented by the general formula (3):

$$(R^2O)_2-\overset{\overset{O}{\|}}{P}O(EO)_nH \quad (3)$$

wherein $R^2$, E and n are the same as in the formula (2);

a weight ratio of compound (a)/(compound (b1)+compound (b2)) being 10/90–95/5, and a weight ratio of compound (b2)/compound (b1) being 20/80 or more, and further comprising an alkali builder in a weight ratio [(compound (a)+compound (b1)+compound (b2))/alkali builder] of 1:0.1–1:2,000.

4 Claims, No Drawings

SURFACTANT COMPOSITION, DEGREASING COMPOSITION AND DEGREASING BATH

This is a continuation of application Ser. No. 07/739,969 filed on Aug. 5, 1991, (now abandoned) which is a continuation-in-part of prior parent application Ser. No. 07/507,436 filed Apr. 11, 1990 (now abandoned).

BACKGROUND OF THE INVENTION

The present invention relates to a surfactant composition, and a degreasing composition and a degreasing bath containing the surfactant composition, and more particularly to a surfactant composition suitable for a degreasing composition having excellent detergency and antifoaming properties at room temperature, and a degreasing composition and a degreasing bath containing such a surfactant composition.

In the chemical coating of metal surfaces, degreasing is usually conducted to remove oil substances (mineral oils, animal or vegetable fats and oils, etc.) from the surfaces of metal members to be formed with chemical coatings.

Degreasing detergents used fox degreasing treatments contain as main components builders based on acids or alkalis and nonionic surfactants, and they are used in the form of aqueous solutions by a spraying method or an immersion method at 40°-70° C. for 1-10 minutes.

However, in view of the recent demands of saving energy, detergents capable of removing oils at lower temperatures such as 5°-40° C. are desired.

As such detergents, Japanese Patent Laid-Open No. 61-60892 discloses an alkali detergent usable at room temperature which contains polyoxyalkylene alkyl ether as a surfactant. The polyoxyalkylene alkyl ether in this detergent has the following general formula:

$$RO(EO)_m(PO)_nH,$$

wherein

R: Alkyl group,

EO: Ethylene oxide group,

PO: Propylene oxide group, and m,n: Mol.

However, although this detergent has improved detergency at room temperature, the level of detergency is still insufficient.

U.S. Pat. No. 3,010,907 to Carroll discloses a non-foaming alkaline cleaning composition comprising a major proportion of an inorganic alkaline material, from 0.05% to 5% by dry weight of the composition of an organic detergent, and from 0.01% to 1% by dry weight of the composition of a defoamer, the inorganic alkaline material being selected from the class consisting of caustic soda, caustic potash, sodium carbonate, sodium bicarbonate, alkali metal silicates, alkali metal phosphates, and mixtures thereof, the organic detergent being an alkyl phenol-ethylene oxide condensation product having the formula:

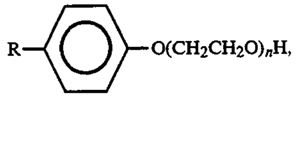

wherein R is an alkyl group having 9 carbon atoms and where n has a value of from 8 to 10, and the defoamer being a phosphate ester of the formula:

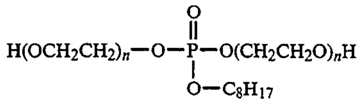

wherein the $C_8H_{17}$ radical is a 2-ethyl hexyl group and where n has a value of approximately 4 to 6.

However, since a phosphate monoester is used as the phosphate ester in this cleaning composition, sufficiently high cleaning power cannot be achieved at a low foaming level.

OBJECTS AND SUMMARY OF THE INVENTION

Accordingly, an object of the present invention is to provide a surfactant composition having excellent detergency at room temperature which is equal to or even higher than under heated conditions (40° C. or higher), with little foaming.

Another object of the present invention is to provide a degreasing composition having excellent detergency at room temperature which is equal to or even higher than under heated conditions (40° C. or higher), with little foaming.

A further object of the present invention is to provide a degreasing bath having excellent detergency at room temperature which is equal to or even higher than under heated conditions (40° C. or higher), with little foaming.

A still further object of the present invention is to provide a degreasing composition and a degreasing bath showing excellent detergency even when oil materials are accumulated in the bath.

As a result of intense research in view of the above objects, the inventors of the present invention have found that a surfactant composition obtained by mixing a polyoxyalkylene ether-type nonionic surfactant containing a predetermined amount of ethylene groups with a phosphate-polyethylene oxide adduct, in which at least 30% of the phosphate is a diester, shows excellent detergency and antifoaming properties at room temperature when combined with an alkali builder. The present invention is based upon this finding.

Thus, the surfactant composition according to the present invention comprises:

a compound (a) represented by the general formula (1):

$$R^1O(AO)_nH \qquad (1)$$

wherein $R^1$ is a substituted or unsubstituted hydrocarbon group having 6 or more carbon atoms; A is at least one group selected from the group consisting of an ethylene group, a propylene group, a butylene group and a styrene group, provided that an ethylene group in A is 5 mol or more per 1 mol of $R^1$, and that the ethylene group is 50 mol % or more per 100 mol % of said A; and n is an integer of 5-50;

a compound (b1) represented by the general formula (2):

$$R^2O-\overset{\overset{\displaystyle O}{\|}}{P}(O(EO)_nH)_2 \qquad (2)$$

wherein $R^2$ is a substituted or unsubstituted hydrocarbon group having 6 or more carbon atoms, E is an ethylene group and n is an integer of 1–20; and a compound (b2) represented by the general formula (3):

$$(R^2O)_2-\overset{\overset{\displaystyle O}{\|}}{P}O(EO)_nH \qquad (3)$$

wherein $R^2$, E and n are the same as in the formula (2), a weight ratio of compound (a)/(compound (b1)+compound (b2)) being 10/90–95/5, and a weight ratio of compound (b2)/compound (b1) being 20/80 or more.

The degreasing composition according to the present invention comprises:

a compound (a) represented by the general formula (1):

$$R^1O(AO)_nH \qquad (1)$$

wherein $R^1$ is a substituted or unsubstituted hydrocarbon group having 6 or more carbon atoms; A is at least one group selected from the group consisting of an ethylene group, a propylene group, a butylene group and a styrene group, provided that an ethylene group in A is 5 mol or more per 1 mol of $R^1$, and that the ethylene group is 50 mol % or more per 100 mol % of said A; and n is an integer of 5–50;

a compound (b1) represented by the general formula (2):

$$R^2O-\overset{\overset{\displaystyle O}{\|}}{P}(O(EO)_nH)_2 \qquad (2)$$

wherein $R^2$ is a substituted or unsubstituted hydrocarbon group having 6 or more carbon atoms, E is an ethylene group, and n is an integer of 1–20; and a compound (b2) represented by the, general formula (3):

$$(R^2O)_2-\overset{\overset{\displaystyle O}{\|}}{P}O(EO)_nH \qquad (3)$$

wherein $R^2$, E and n are the same as in the formula (2), a weight ratio of compound (a)/(compound (b1)+compound (b2)) being 10/90–95/5, and a weight ratio of compound (b2)/compound (b1) being 20/80 or more, and further comprising an alkali builder in a weight ratio [(compound (a)+compound (b1)+compound (b2))/alkali builder] of 1:0.1–1:2,000.

The degreasing bath according to the present invention comprises:

(I) 0.005–0.5 weight % of a surfactant composition comprising:

a compound (a) represented by the general formula (1):

$$R^1O(AO)_nH \qquad (1)$$

wherein $R^1$ is a substituted or unsubstituted hydrocarbon group having 6 or more carbon atoms; A is at least one group selected from the group consisting of an ethylene group, a propylene group, a butylene group and a styrene group, provided that an ethylene group in A is 5 mol or more per 1 mol of $R^1$, and that the ethylene group is 50 mol % or more per 100 mol % of the A; and n is an integer of 5–50;

compound (b1) represented by the general formula (2):

$$R^2O-\overset{\overset{\displaystyle O}{\|}}{P}(O(EO)_nH)_2 \qquad (2)$$

wherein $R^2$ is a substituted or unsubstituted hydrocarbon group having 6 or more carbon atoms, E is an ethylene group, and n is an integer of 1–20; and a compound (b2) represented by the general formula (3):

$$(R^2O)_2-\overset{\overset{\displaystyle O}{\|}}{P}O(EO)_nH \qquad (3)$$

wherein $R^2$, E and n are the same as in the formula (2); a weight ratio of compound (a)/(compound (b1)+compound (b2)) being 10/90–95/5, and a weight ratio of compound (b2)/compound (b1) being 20/80 or more: and (II) 0.05–10 weight % of an alkali builder.

DETAILED DESCRIPTION OF THE INVENTION

The compound (a) used in the present invention is represented by the following general formula (1):

$$R^1O(AO)_nH, \qquad (1)$$

wherein n is an integer of 5–50.

In the above general formula (1), $R^1$ is, as described below in detail, a hydrocarbon group having 6 or more carbon atoms. When the number of carbon atoms is 5 or less, sufficient surfactant activity cannot be obtained, failing to provide good detergency.

"A" in the above general formula (1) is at least one group selected from the group consisting of an ethylene group, a propylene group, a butylene group and a styrene group. Incidentally, the number of the ethylene group in "A" is 5 mol or more per 1 mol of $R^1$. When the ethylene group is less than 5 mol, the resulting surfactant composition does not have sufficient detergency. Further, the proportion of the ethylene group in "A" is 50 mol % or more per 100 mol % of "A." When the proportion of the ethylene group is lower than 50 mol %, the resulting surfactant composition does not show sufficient detergency. Incidentally, the antifoaming properties of the surfactant composition according to the present invention can be freely adjusted by changing the proportion of the ethylene group relative to 100 mol % of "A" in the compound (a) within the above range.

The number (n) of an AO group in the compound (a) is 5–50. When the number (n) of the AO group is less than 5, sufficient detergency cannot be obtained. On the other hand, when n exceeds 50, detergency also becomes insufficient.

Thus, for instance, when n=5, "A" is completely composed of an ethylene group. And when n is 6 or more, a portion exceeding 5 may be a group other than the ethylene group. In this case, the ethylene group should be 50 mol % or more based on the total "A."

Incidentally, as long as the content of an oxyethylene group meets the above requirement, the AO group may be contained in the compound (a) in the form of random addition, block addition or a mixture of block addition and random addition.

The phosphate-ethylene oxide adduct (b) used in the present invention consists of compounds (b1) and (b2).

The compound (b1) is a phosphate monoester-ethylene oxide adduct represented by the following general formula (2):

$$R^2O-\overset{\overset{\displaystyle O}{\|}}{P}(O(EO)_nH)_2 \qquad (2)$$

wherein $R^2$ is a substituted or unsubstituted hydrocarbon group having 6 or more carbon atoms, E is an ethylene group, and n is an integer of 1–20.

In the above general formula (2), $R^2$ is a hydrocarbon group having 6 or more carbon atoms. When the number of carbon atoms is 5 or less, good detergency cannot be obtained.

The mole number (n) of an oxyethylene group represented by EO is 1–20. When there is no oxyethylene group or when the oxyethylene group exceeds 20 mol, sufficient detergency cannot be obtained.

Incidentally, $R^1$ and $R^2$ in the compound (a) and the compound (b1) used in the present invention may be the same or different from each other, and as long as they are hydrocarbon groups having 6 or more carbon atoms, they may be substituted or unsubstituted. Typical examples of $R^1$ and $R^2$ are alkyl groups such as a hexyl group, an octyl group, a decyl group, a dodecyl group, a stearyl group; alkenyl groups such as an oleyl group; cycloalkyl groups such as a cyclohexyl group; alkyl-substituted or phenyl-substituted phenyl groups such as a xylene group, an octyl phenyl group, a nonyl phenyl group, a dodecyl phenyl group, a dinonyl phenyl group, a paracumyl phenyl group, a styrene-added phenyl group; an unsubstituted phenyl group, etc.

The compound (b2) is a phosphate diester-ethylene oxide adduct represented by the general formula (3):

$$(R^2O)_2-\overset{\overset{\displaystyle O}{\|}}{P}O(EO)_nH \qquad (3)$$

wherein $R^2$, E and n are the same as in the formula (2).

In the present invention, a weight ratio of the compound (b2) to the compound (b1) should be 20/80 or more. When the weight ratio of (b2)/(b1) is lower than 20/80, a sufficiently high detergency at a low foaming level cannot be achieved. However, since the phosphate monoester is inevitably by-produced in the production of the phosphate diester under any conditions, the phosphate product would have to be purified if only the phosphate diester is to be used. This necessitates an additional step of separation. Accordingly, from the economic point of view, it is preferable to use a phosphate product containing up to 70 weight % of the diester and 30 weight % or less of the monoester. Namely, the weight ratio of (b2)/(b1) is preferably 20/80–70/30. As long as the weight ratio of (b2)/(b1) is up to 70/30, a separation procedure is not needed to provide the phosphate product having such a (b2)/(b1) weight ratio.

The phosphate-ethylene oxide adduct (b) (mixture of compounds (b1) and (b2)) may be produced by causing an addition reaction of ethylene oxide to a phosphate (mixture of a phosphate monoester and a phosphate diester in the above-mentioned proportion) at a temperature of 50°–200° C. and at pressure of 1–10 kg/cm$^2$ in the presence of an alkali or acid catalyst in an amount of 0.01–1.0% per the total amount of starting materials. The proportion of ethylene oxide to the phosphate may be changed depending on the desired composition of the phosphate ethylene adduct (b).

In the surfactant composition of the present invention, the compound (a), the compound (b1) and the compound (b2) are used in combination.

The weight ratio of the compound (a) to (the compound (b1)+ the compound (b2)) in the surfactant composition of the present invention is 10/90–95/5, preferably 25/75–75/25. When the weight ratio of the compound (a) to the compounds (b1)+(b2) is lower than 10/90 or larger than 95/5, sufficient detergency cannot be obtained.

Next, the degreasing composition of the present invention will be described below.

The degreasing composition of the present invention comprises the above surfactant composition containing the compound (a) and the compounds (b1)+(b2) in a weight ratio of compound (a)/(compound (b1)+compound (b2))=10/90–95/5, and an alkali builder.

The alkali builders which may be used in the present invention include alkali metal salts, alkali phosphate, alkali carbonates, alkali silicates, alkali nitrites, alkali borates, etc., and they may be used alone or in combination.

In the degreasing composition of the present invention, a proportion of the alkali builder to the surfactant composition [weight ratio of (compound (a)+compound (b1)+compound (b2))/alkali builder] is 1:0.1–1:2000, preferably 1:1–1:100.

When the weight ratio of [(compound (a)+compound (b1)+compound (b2))/alkali builder] is less than 1:0.1, the decrease in detergency does not substantially take place, but it is difficult to maintain a pH for suppressing the corrosion of metal members to be treated. 0n the other hand, when the weight ratio exceeds 1:2000, the concentration of the surfactant composition in the degreasing detergent ccomposition becomes too low, resulting in insufficient detergency.

Incidentally, depending upon degreasing facilities, the degreasing composition of the present invention may further contain 5–100 parts by weight of an antifoaming agent per 100 parts by weight of the surfactant composition. When the amount of the antifoaming agent is less than 5 parts by weight, sufficient improvement of antifoaming properties cannot be obtained, and when it exceeds 100 parts by weight, the detergency of the degreasing composition decreases.

The antifoaming agents include higher alcohols, higher ethers, higher aliphatic acids, higher aliphatic acid esters, and alkyl alkylates or alkyl phenol alkylates having HLB values of 10 or less, polypropylene glycols polyethylene glycol ethers, etc. having cloud points of 40° C. or lower, and they may be used alone or in combination.

Next, the degreasing bath of the present invention will be described.

The degreasing bath of the present invention contains the above surfactant composition and the alkali builder. The amount of the surfactant composition is 0.005–0.5 weight %, preferably 0.05–0.3 weight %. When the amount of the surfactant composition is lower than 0.005 weight %, sufficient degreasing activity cannot be obtained. When it exceeds 0.5 weight %, further increase in degreasing activity cannot be achieved.

The amount of the alkali builder is 0.05–10 weight %, preferably 1–5 weight %. When the amount of the alkali builder is less than 0.05 weight %, the degreasing detergent solution has a low pH, making it likely that the metal members to be treated are rusted, and making it difficult to emulsify oil materials removed from the metal members being treated. On the other hand, when the amount of the alkali builder exceeds 10 weight %, it is difficult to dissolve the alkali builder, deteriorating operability.

The composition of the degreasing bath of the present invention can be adjusted by introducing the surfactant composition and 11 the alkali builder separately into a degreasing bath (hereinafter called "separate system") or by mixing them in advance and then introducing the resulting mixture into the degreasing bath (hereinafter called "premixed system").

As far as the operability is concerned, the premixed system is preferable, but from the viewpoint of stability with time, the separate system is preferable. In the case of the premixed system, the amount of the alkali builder is preferably 80 weight % or more based on the surfactant composition to avoid swelling.

As described above, the surfactant composition of the present invention comprises the compound (a) which is a particular polyoxyalkylene ether-type nonionic surfactant, the compound (b1) which is a phosphate monoester-ethylene oxide adduct, and the compound (b2) which is a phosphate diester-ethylene oxide adduct. The compound (a) itself does not have sufficient detergency at room temperature, and the compounds (b1), (b2) themselves do not have detergency at all. Nevertheless, a combination of the compound (a) and the compounds (b1) and (b2) provides a degreasing detergent with good detergency. The reason therefor is not necessarily clear, but it may be considered that a synergistic effect between the compound (a) and the compounds (b1) and (b2) serves to increase the detergency of the compound (a), while providing the degreasing detergent with good antifoaming properties.

Further, the degreasing bath of the present invention utilizing the synergistic effect of the compound (a) and the compounds (b1) and (b2) can maintain degreasing detergency and antifoaming properties equally at start and even after oil accumulation in the bath.

The present invention will be described in further detail by means of the following Examples.

SYNTHESIS EXAMPLE 1

Synthesis of Compound (a)

As the compound (a), the following compounds A1–A9 are synthesized by adding alkylene oxides to various alcohols and phenols having various $R^1$ groups in the general formula (1), in the presence of an alkali catalyst by a usual method.

A1: 7.5 mol of ethylene oxide added to lauryl alcohol.
A2: 10 mol of ethylene oxide added to lauryl alcohol.
A3: 20 mol of ethylene oxide added to lauryl alcohol.
A4: 8 mol of ethylene oxide added to octyl alcohol.
A5: 10 mol of ethylene oxide added to nonyl phenol.
A6: 15 mol of ethylene oxide added to styrene-added phenol.
A7: 10 mol of ethylene oxide block and 3 mol of propylene oxide block added to nonyl phenol.
A8: 10 mol of ethylene oxide and 7 mol of propylene oxide added to nonyl phenol in random.
A9: 10 mol of ethylene oxide block and 2 mol of propylene oxide block added to nonyl phenol.

SYNTHESIS EXAMPLE 2

Synthesis of Phosphates (Mixtures of Monoester and Diester)

Various alcohols in various amounts as shown in Table 1 and 0.19 g of hypophosphorous acid (50%) are introduced into a reactor, and 71.0 g of phosphorus pentoxide (1.0 mol as orthophosphoric acid) kept at 50° C. is poured into the reactor over 3 hours, and stirring is conducted at 100° C. for 3 hours. After the completion of reaction, 4.84 g of water is added to carry out hydrolysis at 80° C. for 3 hours while stirring. The resulting phosphate products have weight ratios of monoester/diester as shown in Table 1 below.

TABLE 1

| Sample No. | Alcohol Type | Alcohol Amount (mol) | Monoester/ Diester |
|---|---|---|---|
| 1 | Lauryl Alcohol | 1.25 | 46/54 |
| 2 | Lauryl Alcohol | 1.25 | 45/55 |
| 3 | Lauryl Alcohol | 1.25 | 47/53 |
| 4 | Octyl Alcohol | 1.25 | 46/54 |
| 5 | Nonyl Phenol | 1.25 | 47/53 |
| 6 | Paracumyl Phenol | 1.25 | 48/52 |

Synthesis of Phosphate-Ethylene Oxide Adducts (b)

As phosphate-ethylene oxide adducts, the following compounds B1–B6 are synthesized by adding ethylene oxide to the phosphates as shown in Table 1 in the presence of an alkali catalyst at a temperature of 120° C.

B1: 3 mol of ethylene oxide added to lauryl alcohol phosphate (Sample No. 1 ).
B2: 5 mol of ethylene oxide added to lauryl alcohol phosphate (Sample No. 2).
B3: 12 mol of ethylene oxide added to lauryl alcohol phosphate (Sample No. 3).
B4: 5 mol of ethylene oxide added to octyl alcohol phosphate (Sample No. 4).
B5: 10 mol of ethylene oxide added to nonyl phenol phosphate (Sample No. 5).
B6: 9 mol of ethylene oxide added to paracumyl phenol phosphate (Sample No. 6).

Synthesis of Compound (c)

For comparison with the phosphate-ethylene oxide adducts (b), the following compound C1 is synthesized by adding 10 mol of ethylene oxide to 1 mol of nonyl phenol in the presence of an alkali catalyst by a usual method, and preparing a phosphate thereof by using phosphorus pentoxide by a usual method.

C1: Phosphate of a nonyl phenol—10 mol ethylene oxide adduct.

EXAMPLES 1-17, COMPARATIVE EXAMPLES 1-16

Each of surfactant compositions containing the above compounds A1-A9, B1-B6 and C1 as shown in Table 2 is mixed with an alkali builder in a proportion shown in Table 3 to prepare each degreasing composition.

2 parts by weight of each degreasing composition is mixed with 98 parts by weight of water to prepare each degreasing detergent solution bath.

Evaluation of Detergency

With respect to each degreasing detergent solution, detergency is evaluated at start (fresh composition) and after oil accumulation in the bath.

(1) Detergency at Start

Each degreasing detergent solution is introduced into a 50.0 ml-beaker and kept at 15° C. A steel test piece (JIS G-3141) is immersed in the solution, and the solution is stirred at 200 rpm for 10 minutes. Thereafter, the steel test piece is removed and rinsed by running water for 30 seconds to measure water wettability of the steel test piece surface. This is regarded as detergency at start. Incidentally, the detergency is regarded as 100% when the entire surface of the steel test piece is still wet with water 30 seconds after the removal from the bath, and the water wettability is expressed by percentage of surface area wet with water observed by the naked eye.

(2) Detergency after Oil Accumulation

With respect to the above degreasing composition mixed with 2000 ppm of an anti-corrosion oil ("Antirust P1400," manufactured by Nippon Oil Co., Ltd.), a water wettability is measured on the steel test piece surface in the same method as in the detergency at start, and it is evaluated as detergency after oil accumulation.

The evaluation results of each detergency are shown in Table 2.

TABLE 2

| | Composition of Surfactant (Weight Ratio) | Detergency (%) At Start | Detergency (%) After Oil Accumulation |
|---|---|---|---|
| Example No. | | | |
| 1 | A1/B5 = 75/25 | 100 | 100 |
| 2 | A1/B5 = 50/50 | 100 | 100 |
| 3 | A1/B5 = 25/75 | 95 | 90 |
| 4 | A2/B5 = 50/50 | 100 | 100 |
| 5 | A3/B5 = 50/50 | 90 | 85 |
| 6 | A4/B5 = 50/50 | 90 | 80 |
| 7 | A5/B5 = 50/50 | 100 | 90 |
| 8 | A6/B5 = 50/50 | 90 | 90 |
| 9 | A7/B5 = 50/50 | 100 | 95 |
| 10 | A8/B5 = 50/50 | 95 | 90 |
| 11 | A9/B5 = 50/50 | 95 | 90 |
| 12 | A1/B1 = 50/50 | 90 | 90 |
| 13 | A1/B2 = 50/50 | 100 | 100 |
| 14 | A1/B3 = 50/50 | 95 | 90 |
| 15 | A1/B4 = 50/50 | 95 | 90 |
| 16 | A1/B5 = 50/50 | 90 | 80 |
| 17 | A1/B6 = 50/50 | 95 | 90 |
| Compara. Example No. | | | |
| 1 | Only A1 | 50 | 0 |
| 2 | Only A2 | 70 | 20 |
| 3 | Only A3 | 40 | 0 |
| 4 | Only A4 | 30 | 0 |
| 5 | Only A5 | 75 | 20 |
| 6 | Only A6 | 30 | 0 |
| 7 | Only A7 | 60 | 0 |

TABLE 2-continued

| | Composition of Surfactant (Weight Ratio) | Detergency (%) At Start | Detergency (%) After Oil Accumulation |
|---|---|---|---|
| 8 | Only A8 | 40 | 0 |
| 9 | Only A9 | 0 | 0 |
| 10 | Only B1 | 0 | 0 |
| 11 | Only B2 | 0 | 0 |
| 12 | Only B3 | 0 | 0 |
| 13 | Only B4 | 0 | 0 |
| 14 | Only B5 | 0 | 0 |
| 15 | Only C1 | 10 | 0 |
| 16 | A1/C1 = 50/50 | 50 | 0 |

TABLE 3

| Composition | Parts by Weight |
|---|---|
| Surfactant Composition | 10 |
| Alkali Builder | |
| Sodium Metasilicate.$5H_2O$ | 45 |
| Anhydrous Sodium Carbonate | 18 |
| Sodium Phosphate | 18 |
| Sodium Nitrate | 9 |

As is clear from Table 2, the degreasing compositions of the present invention (Examples 1-17) are much better than those of Comparative Examples 1-16 both at start and after oil accumulation.

EXAMPLES 18-21, COMPARATIVE EXAMPLES 17-19

Evaluation of Antifoaming Properties

Various compounds (a) and phosphate-ethylene oxide adducts (b) are mixed in proportions shown in Table 4 to prepare surfactant compositions, and each surfactant composition is mixed with an alkali builder in a proportion shown in Table 3 to prepare a degreasing composition. Next, 2 parts by weight of each degreasing composition is mixed with 98 parts by weight of water to prepare a degreasing detergent solution.

The evaluation of antifoaming properties is conducted on the resulting degreasing detergent solution by a Ross-Miles Test Method. Specifically, 200 ml of the degreasing composition solution is dropped from a height of 90 cm onto a 50 ml of degreasing composition solution contained in a glass cylinder of 50 mm in inner diameter at 25° C. for 30 seconds to measure the height (mm) of a foam generated immediately after dropping and the height (mm) 5 minutes after dropping. The height of a foam is expressed as a level of foaming.

The evaluation results of antifoaming properties are shown in Table 4.

TABLE 4

| No. | Composition of Surfactant (Weight Ratio) | Foaming Level (mm) Immediately After Foaming | Foaming Level (mm) 5 Minutes After Foaming |
|---|---|---|---|
| Example | | | |
| 18 | A1/B1 = 50/50 | 50 | 35 |
| 19 | A1/B2 = 50/50 | 60 | 43 |
| 20 | A2/B1 = 50/50 | 65 | 50 |
| 21 | A5/B1 = 50/50 | 68 | 44 |
| Comparative Example | | | |
| 17 | Only A-1 | 120 | 75 |
| 18 | Only A-2 | 140 | 117 |
| 19 | Only A-5 | 133 | 104 |

As is clear from Table 4, the degreasing composition solutions of the present invention are more excellent in antifoaming properties than those containing conventional surfactants in Compartive Examples 17–19.

EXAMPLES 22 AND 23, COMPARATIVE EXAMPLES 20 AND 21

A5 and B1 are selected as the compound (a) and the phosphate-ethylene oxide adduct (b), and mixed in a weight ratio of 50/50 to prepare a surfactant composition, and the surfactant composition is mixed with an alkali builder in the proportion shown in Table 5 to prepare a degreasing composition. Next, each degreasing composition is mixed with water in a proportion shown in Table 5 to prepare a degreasing composition solution. The resulting degreasing composition solution is evaluated with respect to detergency and antifoaming properties in the same method as above. The evaluation results are shown in Table 5.

TABLE 5

| | Example No. | | Comparative Example No. | |
|---|---|---|---|---|
| | 22 | 23 | 20 | 21 |
| Composition of Degreasing Detergent Solution (Parts by Weight) | | | | |
| Surfactant (X) | 2 | 2 | 0.04 | 1 |
| Alkali Builder (Y) | 2 | 200 | 100 | 0.1 |
| Water (Z) | 980 | 1798 | 900 | 980 |
| X/Y | 1/1 | 1/100 | 1/2500 | 1/0.1 |
| [X/(X + Y + Z)] × 100 (weight %) | 0.2 | 0.1 | 0.004 | 0.1 |
| [Y/(X + Y + Z)] × 100 (weight %) | 0.2 | 10 | 10 | 0.01 |
| Detergency (%) | | | | |
| At Start | 100 | 100 | 10 | 100* |
| After Oil Accumulation | 95 | 100 | 0 | 70* |
| Foaming Level (mm) | | | | |
| Immediately After Foaming | 70 | 67 | 5 | — |
| 5 Minutes After Foaming | 40 | 42 | 2 | — |

Note *: Steel test piece was rusted.

As is clear from Table 5, the degreasing composition solutions in Examples 22 and 23 are much better in detergency than that of Comparative Example 20 in which the proportion of the surfactant composition to the alkali builder is less than 1/2000. In addition, in Comparative Example 22, in which the content of the alkali builder in the degreasing composition solution is less than 0.05 weight %, the steel test piece is rusted in the evaluation process of detergency. Therefore, a proper amount of the alkali builder is important to adjust pH, thereby achieving the object of the present invention.

SYNTHESIS EXAMPLE 3

Synthesis of Phosphates (Mixtures of Monoester and Diester)

2-Ethylhexanol in various amounts as shown in Table 6 and 0.19 g of hypophosphorous acid (50%) are introduced into a reactor, and 71.0 g of phosphorus pentoxide (1.0 mol as orthophosphoric acid) kept at 50° C. is poured into the reactor over 3 hours, and stirring is conducted at 100° C. for 3 hours. After the completion of reaction, 4.84 g of water is added to carry out hydrolysis at 80° C. for 3 hours while stirring. The resulting phosphate products (Sample Nos. 7–10) have weight ratios of monoester/diester as shown in Table 6 below.

Synthesis of Phosphate (Mostly Monoester)

Apart from the above, 130 g (1.0 mol) of 2-ethylhexanol and 130 g of n-hexane are introduced into a pressure-resistant reactor and sufficiently mixed therein. While stirring the resulting mixture at 70° C., 467 g (5.0 mol as orthophosphoric acid) of polyphosphoric acid (105%) is dropped into the reactor. After the completion of dropping, the mixture is stirred at 80° C. for 10 hours. After the completion of reaction, 46.5 g of water is added, and stirring is continued at 80° C. for 3 hours.

The resulting hydrolyzate is cooled to 50° C. and transferred to an extractor to carry out an extraction treatment with n-hexane. By distilling the solvent, a phosphate product (Sample No. 11), in which a monoester/diester weight ratio is 98/2, is obtained. This is also shown in Table 6.

TABLE 6

| Sample No. | 2-Ethylhexanol | Monoester/Diester |
|---|---|---|
| 7 | 130 g (1.0 mol) | 60/40 |
| 8 | 97.5 g (0.75 mol) | 76/24 |
| 9 | 163 g (1.25 mol) | 47/53 |
| 10 | 195 g (1.50 mol) | 32/68 |
| 11 | 130 g (1.0 mol) | 98/2 |

Synthesis of Phosphate-Ethylene Oxide Adduct

Each of the phosphate products (Sample Nos. 7–11) is reacted with ethylene oxide in such a proportion that the resulting adduct contains 5 mol of ethylene oxide per 1 mol of the phosphate in the presence of an alkali catalyst at a temperature of 120° C.

EXAMPLES 24–27, COMPARATIVE EXAMPLE 22

First, with respect to each phosphate-ethylene oxide adduct, 0.1%-aqueous solution thereof is prepared, and its wetting time is measured at 25° C. The results are shown in Table 7.

TABLE 7

| Sample No. | Wetting Time (sec) |
|---|---|
| 7 | 320 |
| 8 | 450 |
| 9 | 121 |
| 10 | 106 |
| 11 | >700 |

Next, the compound (A5) is mixed with each of the phosphate-ethylene oxide adducts (Sample Nos. 7–11) in a proportion as shown in Table 8 to prepare each degreasing composition. 2 parts by weight of each degreasing composition as shown in Table 3 is mixed with 98 parts by weight of water to prepare each degreasing detergent solution.

With respect to each degreasing detergent solution, detergency (at start and after oil accumulation) and antifoaming properties are measured. The results are shown in Table 8.

TABLE 8

| No. | Composition of Surfactant (Weight Ratio) | Detergency (%) | |
|---|---|---|---|
| | | At Start | After Oil Accumulation |
| Example | | | |
| 24 | A5/Sample No. 7 = 50/50 | 95 | 90 |
| 25 | A5/Sample No. 8 = 50/50 | 90 | 80 |
| 26 | A5/Sample No. 9 = 50/50 | 100 | 90 |
| 27 | A5/Sample No. 10 = 50/50 | 100 | 95 |
| Comparative Example | | | |
| 22 | A5/Sample No. 11 = 50/50 | 80 | 65 |
| | | Foaming Level (mm) | |
| | | Immediately After Foaming | 5 Minutes After Foaming |
| Example | | | |
| 24 | A5/Sample No. 7 = 50/50 | 67 | 45 |
| 25 | A5/Sample No. 8 = 50/50 | 75 | 51 |
| 26 | A5/Sample No. 9 = 50/50 | 58 | 42 |
| 27 | A5/Sample No. 10 = 50/50 | 54 | 41 |
| Comparative Example | | | |
| 22 | A5/Sample No. 11 = 50/50 | 110 | 74 |

As described above in detail, since the surfactant composition of the present invention contains the compound (a) and the phosphate-ethylene oxide adduct (b) (diester/monoester=20/80 or more) in a weight ratio [compound (a)/adduct (b)] of 10/90–95/5, the degreasing composition and degreasing bath containing such a surfactant composition and an alkali builder are excellent in detergency and antifoaming properties at room temperature.

The degreasing detergent of the present invention can advantageously maintain detergency and antifoaming properties even after oil accumulation in the bath on an equal level to that at start.

What is claimed is:

1. An aqueous degreasing composition consisting essentially of:

(a) a compound represented by the general formula (1)

$$R^1O(AO)_nH \quad (1)$$

wherein $R^1$ is a substituted or unsubstituted hydrocarbon group having 6 or more carbon atoms, wherein when substituted the substituent on $R^1$ is at least one substituent selected from the group consisting of alkyl groups, alkenyl groups, cycloalkyl groups, alkyl-substituted phenyl groups, phenyl-substituted phenyl groups, and unsubstituted phenyl groups; A is at least one group selected from the group consisting of an ethylene group, a propylene group, a butylene group and a styrene group, provided that an ethylene group in A is 5 mols or more per 1 mol of $R^1$, and that the ethylene group is 50 mol % or more per 100 mol % of said A; and n is an integer of 5–50;

(b1) a compound represented by the general formula (2):

$$R^2O-\overset{O}{\overset{\|}{P}}(O(EO)_nH)_2 \quad (2)$$

wherein $R^2$ is an substituted or unsubstituted hydrocarbon group having 6 or more carbon atoms, wherein when substituted the substituent on $R^2$ is at least one substituent selected from the group consisting of alkyl groups, alkenyl groups, cycloalkyl groups, alkyl-substituted phenyl groups, phenyl-substituted phenyl groups, and unsubstituted phenyl groups, E is an ethylene group, and n is an integer of 1–20;

(b2) a compound represented by the general formula (3):

$$(R^2O)_2-\overset{O}{\overset{\|}{P}}O(EO)_nH \quad (3)$$

wherein $R^2$, E and n are the same as in the formula (2);

(c) an alkali builder; and (d) water, a weight ratio of compound (a)/(compound (b1)+compound (b2)) being 10/90–95/5, and a weight ratio of compound (b2)/compound (b1) being 20/80 or more, and a weight ratio of (compound (a)+compound (b1)+compound (b2))/said alkali builder being 1:1–1:100.

2. An aqueous degreasing bath consisting essentially of:

(I) 0.005–0.5 weight % of a surfactant composition comprising (a) a compound represented by the general formula (I):

$$R^1O(AO)_nH \quad (1)$$

wherein $R^1$ is a substituted or unsubstituted hydrocarbon group having 6 or more carbon atoms, wherein when substituted the substituent on $R^1$ is at least one substituent selected from the group consisting of alkyl groups, alkenyl groups, cycloalkyl groups, alkyl-substituted phenyl groups phenyl-substituted phenyl groups, and unsubstituted phenyl groups; A is at least one group selected from the group consisting of an ethylene group, a propylene group, a butylene group and a styrene group, provided that an ethylene group in A is 5 mols or more per 1 mol of $R^1$, and that the ethylene group is 50 mol % or more per 100 mol % of said A; and n is an integer of 5–50;

(b1) a compound represented by the general formula (2):

$$R^2O-\overset{O}{\overset{\|}{P}}(O(EO)_nH)_2 \quad (2)$$

wherein $R^2$ is an substituted or unsubstituted hydrocarbon group having 6 or more carbon atoms, wherein when substituted the substituent on $R^2$ is at least one substituent selected from the group consisting of alkyl groups, alkenyl groups, cycloalkyl groups, alkyl-substituted phenyl groups, phenyl-substituted phenyl groups, and unsubstituted phenyl groups, E is an ethylene group, and n is an integer of 1–20;

(b2) a compound represented by the general formula (3):

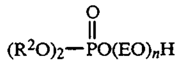

(3)

wherein $R^2$, E and n are the same as in the formula (2); and (c) water, a weight ratio of compound (a)/(compound (b1)+compound (b2)) being 10/90-95/5, a weight ratio of compound (b2)/compound (b1) being 20/80 or more, and a weight ratio of (compound (a)+compound (b1)+(compound (b2)/said alkali builder being 1:1-1:100; and (II) 0.05-10 weight % of an alkali builder.

3. The aqueous degreasing composition according to claim 1, wherein a weight ratio of compound (b2)/compound (b1) is 20/80-70/30.

4. The aqueous degreasing bath according to claim 2, wherein a weight ratio of compound (b2)/compound (b1) is 20/80-70/30.

* * * * *